(12) United States Patent
Biller et al.

(10) Patent No.: US 6,443,380 B1
(45) Date of Patent: Sep. 3, 2002

(54) SEAT BELT RETRACTION SERIAL COUPLING MECHANISM

(75) Inventors: Joachim Biller, Lorch; Wolfgang Holbein, Alfdorf, both of (DE)

(73) Assignee: TRW Occupant Restraint Systems GmbH & Co. KG, Alfdorf (DE)

( * ) Notice: Subject to any disclaimer, the term of this patent is extended or adjusted under 35 U.S.C. 154(b) by 0 days.

(21) Appl. No.: 09/574,181

(22) Filed: May 18, 2000

(30) Foreign Application Priority Data

May 21, 1999 (DE) .......................... 299 08 959

(51) Int. Cl.[7] .............................. B65H 75/48
(52) U.S. Cl. .................. 242/374; 280/806; 297/478
(58) Field of Search .................. 242/374; 280/206; 297/478

(56) References Cited

U.S. PATENT DOCUMENTS

| 1,128,465 A | 2/1915 | Lasley |
| 4,220,019 A | 9/1980 | Mast et al. |
| 4,925,123 A * | 5/1990 | Frei et al. ............... 242/107 |
| 4,976,347 A | 12/1990 | Sakakibara et al. |

FOREIGN PATENT DOCUMENTS

| DE | 662730 | 7/1938 |
| DE | 3600002 A1 | 7/1987 |
| DE | 3715846 A1 | 12/1988 |
| DE | 4322798 A1 | 2/1994 |
| EP | 0580988 A1 | 2/1994 |

* cited by examiner

*Primary Examiner*—Donald P. Walsh
*Assistant Examiner*—Jonathan R. Miller
(74) *Attorney, Agent, or Firm*—Tarolli, Sundheim, Covell, Tummino & Szabo L.L.P.

(57) ABSTRACT

A coupling mechanism, in particular for connecting a belt tensioner drive with a belt spool of a belt retractor for a vehicle safety belt, comprises a driving part, an intermediate part, a driven part, a form-fitting coupling and a force-fitting coupling. The form-fitting coupling and the force-fitting coupling are connected in series. The coupling mechanism has an initial state in which the form-fitting coupling is engaged and the force-fitting coupling is disengaged.

22 Claims, 8 Drawing Sheets

SEAT BELT RETRACTION SERIAL COUPLING MECHANISM

The invention relates to a coupling mechanism, in particular for connecting a belt tensioner drive with a belt spool of a belt retractor for a vehicle safety belt.

BACKGROUND OF THE INVENTION

In order to ensure, in the case of an accident, that the vehicle occupant takes part in the deceleration of the vehicle as early as possible, belt tensioners are often used in connection with the safety belt system. These draw the belt webbing taut and eliminate the so-called belt slack as soon as they are triggered by means of a sensor which is arranged in the vehicle. The belt tensioner engages here on the belt spool by means of a coupling mechanism and sets this belt spool in rotation.

After the end of the action of the belt tensioner and after the vehicle occupant has been stopped by the belt, if possible the normal function of the belt retractor is to be brought about again, so that belt webbing can be unwound, so that the vehicle occupant can move freely.

The coupling mechanism which connects the belt tensioner drive with the belt spool was intended to see to it that on the one hand the belt tensioner in operation is coupled to the belt spool and on the other hand this connection between the belt spool and the belt tensioner is released again after the end of the action of the belt tensioner. For this purpose, the use of various types of coupling is known. For example, grip roller couplings are used, which offer the advantage that they ensure a gentle engagement but have the disadvantage that the disengagement is difficult to produce. On the other hand, pawl couplings are used, which can easily and reliably release the connection with the belt tensioner, but with the engagement process, through the jerky engagement of the pawls, lead to a high stressing of the components of the coupling mechanism.

The invention therefore has the object of providing a coupling mechanism which ensures a gentle engagement of the belt tensioner at the start of the belt tensioning and a reliable disengagement after the tensioning process.

BRIEF DESCRIPTION OF THE INVENTION

The invention provides a coupling mechanism, in particular for connecting a belt tensioner drive with a belt spool of a belt retractor for a vehicle safety belt, comprising a driving part, an intermediate part, a driven part, a form-fitting coupling and a force-fitting coupling. The form-fitting coupling and the force-fitting coupling are connected in series. The coupling mechanism has an initial state in which the form-fitting coupling is engaged and the force-fitting coupling is disengaged.

In this connection, the term "initial state" designates the state before an accident, i.e. before the actuation of the belt tensioner. In the initial state, the safety belt has the normal retraction- and unwinding function of a conventional belt retractor, belt tensioner and belt retractor are uncoupled. The coupling mechanism of the invention is designed so that it can be used together with a conventional blocking mechanism of a belt retractor. The term "operating state" is to be understood as the state during the action of the belt tensioner, in which belt tensioner and belt retractor are coupled with each other. Accordingly, the term "after an operation" designates the state which occurs after the belt tensioner has completed its action; here, the belt tensioner and belt retractor are uncoupled again.

Through the series connection of the two couplings, it is possible to connect the output- and the driving parts with each other by means of the intermediate part, one of the two couplings being respectively arranged between the driving part and the intermediate part or between the driven part and the intermediate part. As in the initial state the form-fitting coupling is engaged and the force-fitting coupling is disengaged, the intermediate piece in the initial state is either connected with the driving part or with the driven part.

The coupling mechanism of the invention combines the advantages of form-fitting and force-fitting coupling types and in so doing avoids the disadvantages thereof, because the reliably disengaging form-fitting coupling is only used for disengagement and the gently engaging force-fitting coupling is only used for engaging. With the transition into the operating state, the force-fitting coupling, which is disengaged in the initial state, is engaged, a gentle engaging being ensured through the use of this type of coupling. The form-fitting coupling is already engaged, so that the abrupt and jerky engaging process of this type of coupling is avoided. In the operating state, both couplings are engaged. Thus the driving part is connected with the driven part via the intermediate part and forms a compact element for the transmission of force from the belt tensioner to the belt spool. After operation, the loosening of the connection between the belt tensioner and the belt spool takes place by the disengaging of the form-fitting coupling which is already engaged in the initial state. Owing to the type of construction of this coupling, the disengagement process takes place in a very reliable manner. The force-fitting coupling, which is complicated to release, remains engaged, After the connection of the belt spool with the belt tensioner is released, the belt spool is freely rotatable again within the framework of the function of a conventional belt retractor.

According to a preferred embodiment, the form-fitting coupling is arranged between the drive- and the intermediate part and the force-fitting coupling is arranged between the intermediate part and the driven part. Thereby, in the initial state, the intermediate part is connected via the form-fitting coupling with the driving part, whereas the belt spool is freely rotatable, because the force-fitting coupling is disengaged. This arrangement offers the advantage that with a radially externally arranged driving part, for accommodating a mechanically costly form-fitting coupling, e.g. a pawl coupling, a large amount of space is available, which reduces the manufacturing expenditure and hence the costs. A form-fitting coupling, e.g. a grip roller coupling, is on the other hand also simple to realize in a confined space. Thus, this arrangement offers the possibility of producing the coupling mechanism at a favorable price.

In particular, it is advantageous if the form-fitting coupling is a pawl coupling. Pawl couplings are easy to realize and ensure a reliable disengagement.

Furthermore, in this advantageous embodiment, provision is made that the force-fitting coupling is a grip roller coupling. Such a coupling ensures a gentle and reliable engagement and a firm connection of the coupled parts.

In an advantageous further development of the invention, holding pins are provided which in the initial state hold the rolling elements of the grip roller coupling and/or the pawls of the pawl coupling in an initial state. This ensures that during the normal operation of the belt retractor in the initial state, the pawl coupling remains engaged and that the grip roller coupling does not engage.

In particular, it is advantageous if the driven part is formed by the axle of the belt spool, because hereby the number of components of the coupling mechanism can be reduced and the manufacturing costs can be made less.

Furthermore, the invention is characterized in that a spring is provided which after operation brings about a rotation of the driven part and thus releases the form-fitting coupling. Advantageously, this spring is the return spring of a belt retractor, so that no additional component has to be provided and thus the expenditure on space and the manufacturing costs can be reduced. As the driving part, e.g. the axle of the belt spool, is connected with the intermediate part via the grip roller coupling, it is thus possible, by means of a rotation of the belt spool, to disengage the pawl coupling between the driving part and the intermediate part and hence to release the connection of the belt spool with the belt tensioner. As a pawl coupling can already be released by a slight rotation, the disengagement mechanism is able to be brought about with minimal effort.

According to another advantageous embodiment of the invention, the force-fitting coupling is arranged between the driving part and the intermediate part and the form-fitting coupling is arranged between the intermediate part and the driven part. Here, it is particularly advantageous if the form-fitting coupling is a claw coupling, because in this way, with a small expenditure in terms of space, a simple and reliable coupling can be created. In this case, in the initial state, the axle of the belt spool is connected with the intermediate part, the axis and intermediate part being freely rotatable with respect to the driving part. The external arrangement of the driving part offers the advantage that a belt tensioner is able to be connected simply therewith.

In this embodiment, furthermore, a spring is provided which after operation moves the intermediate part laterally along the axle of the belt spool and thus releases the form-fitting coupling. Through the displacement of the intermediate part, which is now firmly connected with the driving part, along the axis, the claw coupling, which connects the belt tensioner with the belt spool, can be disengaged in a simple manner.

BRIEF DESCRIPTION OF THE DRAWINGS

Further features and advantages of the invention will be apparent from the following detailed description of the preferred embodiments and from the drawings, to which reference is made. In the drawings.

DETAILED DESCRIPTION OF THE INVENTION

The figures show a coupling mechanism according to the invention, which can be used to connect a belt tensioner drive with a belt spool of a belt retractor for a vehicle safety belt.

Although the invention is also able to be used for other applications, it is illustrated here with regard to this specific case of appication.

Figure 1:
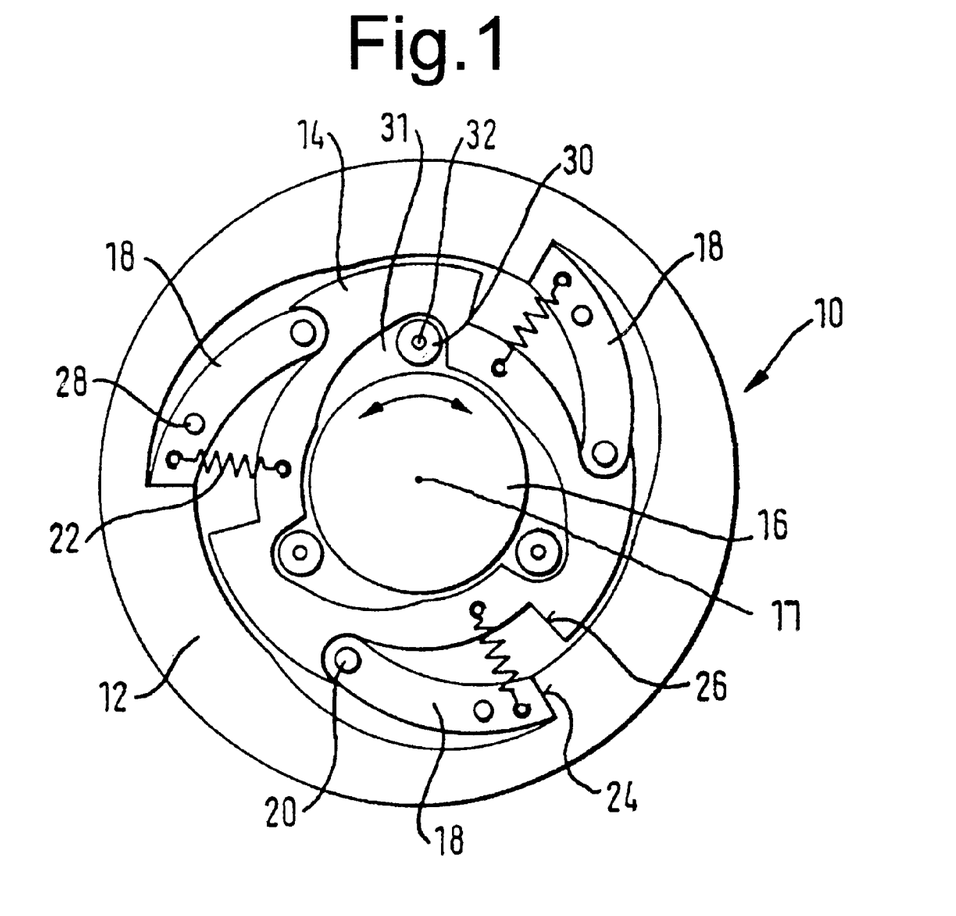
FIG. 1 shows a coupling mechanism according to a first embodiment of the invention in the initial state.
Figure 2:
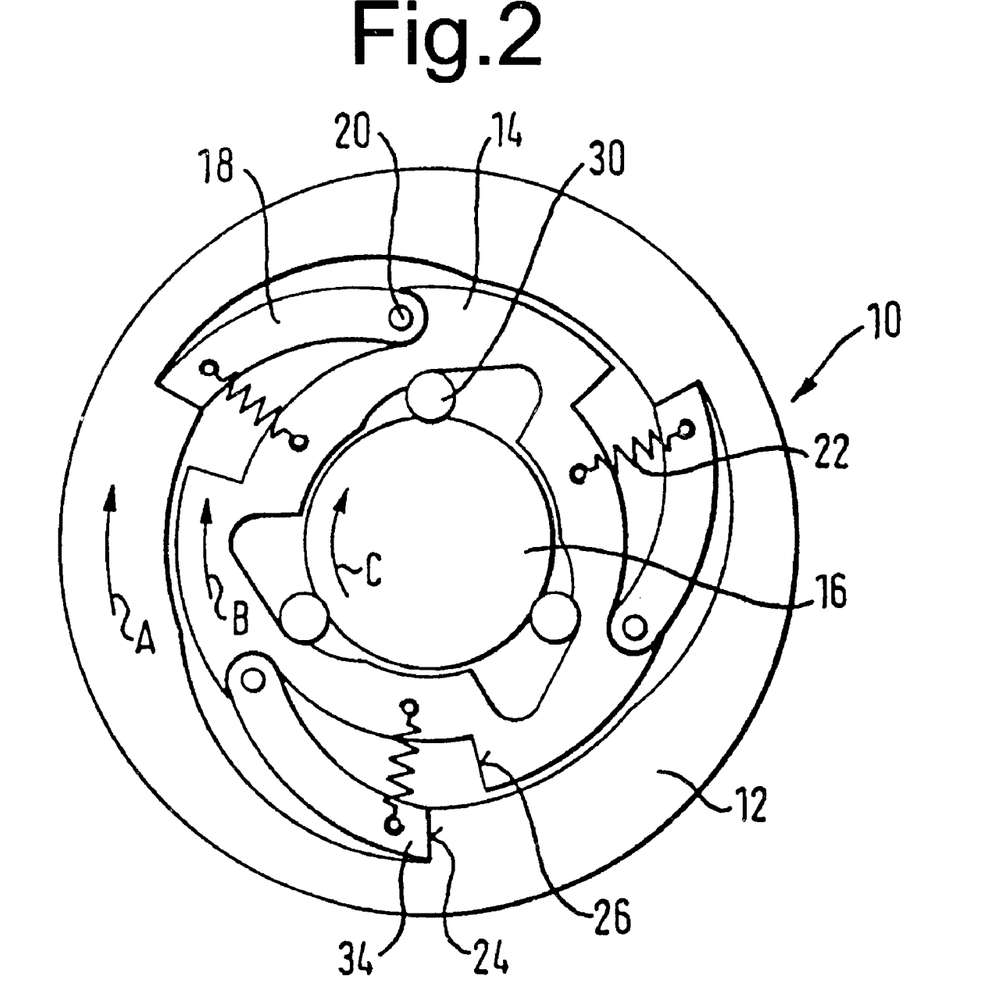
FIG. 2 shows a coupling mechanism according to a first embodiment in its operating state.
Figure 3:
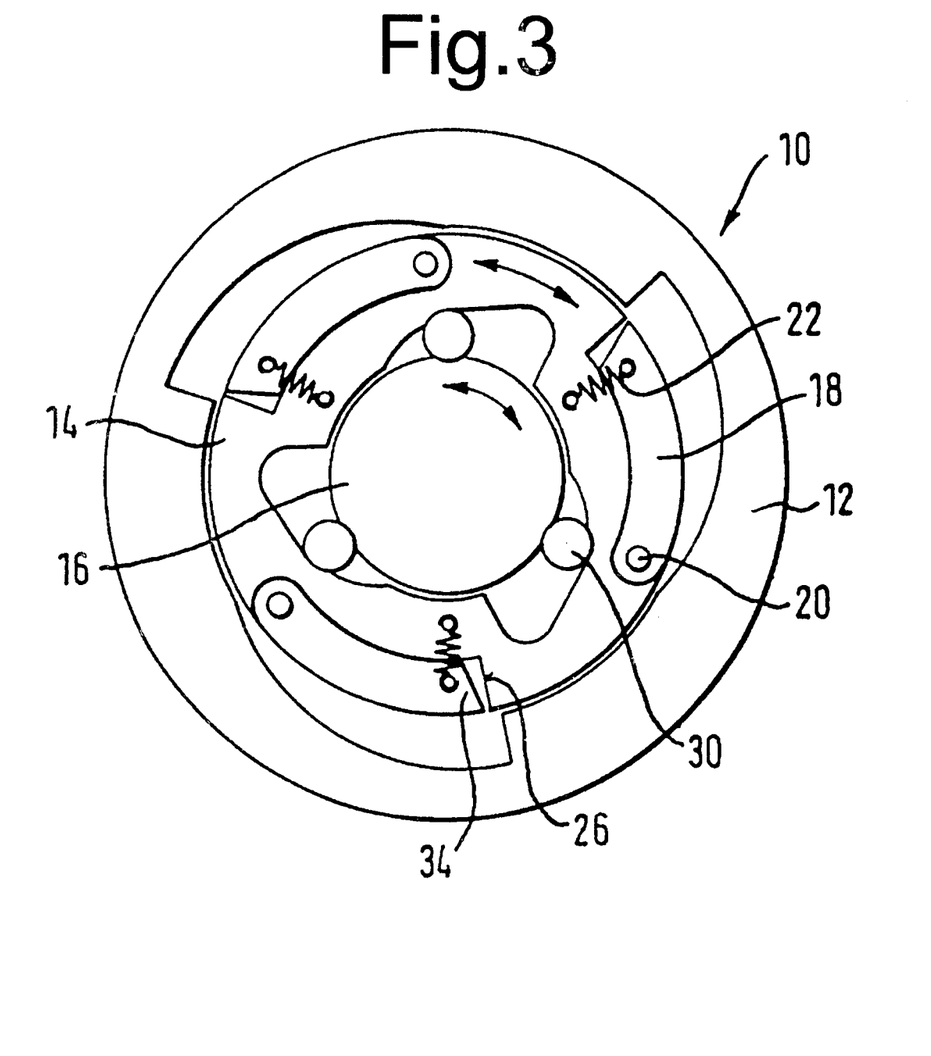
FIG. 3 shows a coupling mechanism according to a first embodiment after operation.

In FIGS. 1 to 3, a coupling mechanism 10 according to the invention is illustrated in accordance with a first embodiment with a driving part 12, n intermediate part 14 an a driven part 16. A belt tensioner (not shown) engages on the driving part 12. Here, the construction of the belt tensioner is of no importance for the invention, it is merely relevant that a rotary movement is brought about, which is transferred to the driving part. The coupling with the driving part takes place in a known manner. The driving part 12 is connected with the intermediate part 14 via a form-fitting coupling, in this case a pawl coupling. This intermediate part 14 is connectable via a force-fitting coupling, in this case a grip roller coupling, with the driven part 16. The driven part 16 is in turn connected with the belt spool (not shown) and can, as in this case, be the axis 17 of the belt spool itself. The pawls 18 of the pawl coupling are rotatably mounted on the intermediate part 14 on an axis 20 and are acted upon by spring 22 in the direction of the intermediate part 14. In the initial state, the pawls 18 of the pawl coupling are engaged in recesses 24 on the driving part 12. In the intermediate part 14, corresponding recesses 26 are provided, which can receive the pawls 18 (see FIG. 3).

In order to prevent a premature disengagement of the pawls 18, the pawls 18 are fixed in their position by holding pins 28.

The grip roller coupling between the intermediate part 14 and the driven part 16 is in a disengaged state. The roll elements 30 are held by holding pins 32, in order to prevent a premature engagement. The axis 17 of the belt spool is freely rotatable both in the belt unwinding and also in the belt winding direction (within the framework of the normal function of a conventional belt retractor). This is indicated by the arrow in FIG. 1.

In FIGS. 2 and 3, the mode of operation of this coupling mechanism is illustrated for the operation of the belt tensioner (FIG. 2) and after the end of operation of the belt tensioner (FIG. 3). The same parts of the coupling mechanism are named here in all three figures by the same reference numbers.

FIG. 2 shows the coupling mechanism 10 during the operation of the belt tensioner. Through the activity of the belt tensioner, the driving part 12 is turned in arrow direction A. Through the rotation, the intermediate part 14 is entrained, so that the latter turns in the same direction of rotation (arrow B). The holding pins 28 for the pawls 18 of the pawl coupling are designed so that they shear off or break off as soon as a movement is transferred by the driving part 12 onto the intermediate part 14 and hence onto the pawls 18.

Due to the construction of the grip roller coupling arranged between the intermediate part 14 and the driven part 16, the roll elements 30 of this coupling wedge between the driven part 16 and the intermediate part 14 in the recesses 31, the holding pins 32 shearing off and thus bringing about the engagement of the grip roller coupling. The driven part 16 and intermediate part 14 are preferably manufactured from a material which permits a deformation by the roll elements 30, but in so doing at the same time provides for as stable a connection as possible between the roll elements 30 and the driven part 16 or the intermediate part 14. The roll elements 30 preferably consist of a correspondingly harder material, the two materials being coordinated with each other.

Through the engaging of the grip roller coupling, the movement of the driving part 12 and of the intermediate part 14 is transferred to the driven part 16, i.e., in this case in the axis 17 of the belt spool (arrow C), so that the belt spool is turned in the rolling direction and the belt is tensioned.

In order to make possible the rotation of the belt spool again after the operation of the belt tensioner, it is necessary to release the connection to the driving part 12 which is now at a standstill again, because the intermediate part 14 is now connected with the driven part 16 by means of the grip roller coupling which is designed so as to be non-releasable. This takes place through a rotation of the belt spool in the belt retraction direction, e.g., in that after an impact, the vehicle occupant leans back again or has been thrown back, and thereby play occurs in the belt webbing, which makes it possible for the retraction mechanism to turn the belt spool in the winding direction. As the intermediate part 14 continues to be firmly connected with the driven part 16, while the driving part 12 is fixed, through the movement in belt retraction direction of the driven part 16 which is connected with the belt spool, the free end 34 of the pawl 18 is moved away from the recess 24 in the driving part 12, against which it was lying, and is drawn by the elastic force towards the intermediate part 14. The recesses 26 in the intermediate part 14 are constructed so that the pawls 18 fit each other so that the intermediate part 14 has a circular smooth outer contour and thereby, without the risk of catching in the driving part 12, can be moved with the belt spool. Now the coupling mechanism is released again.

Figure 4:
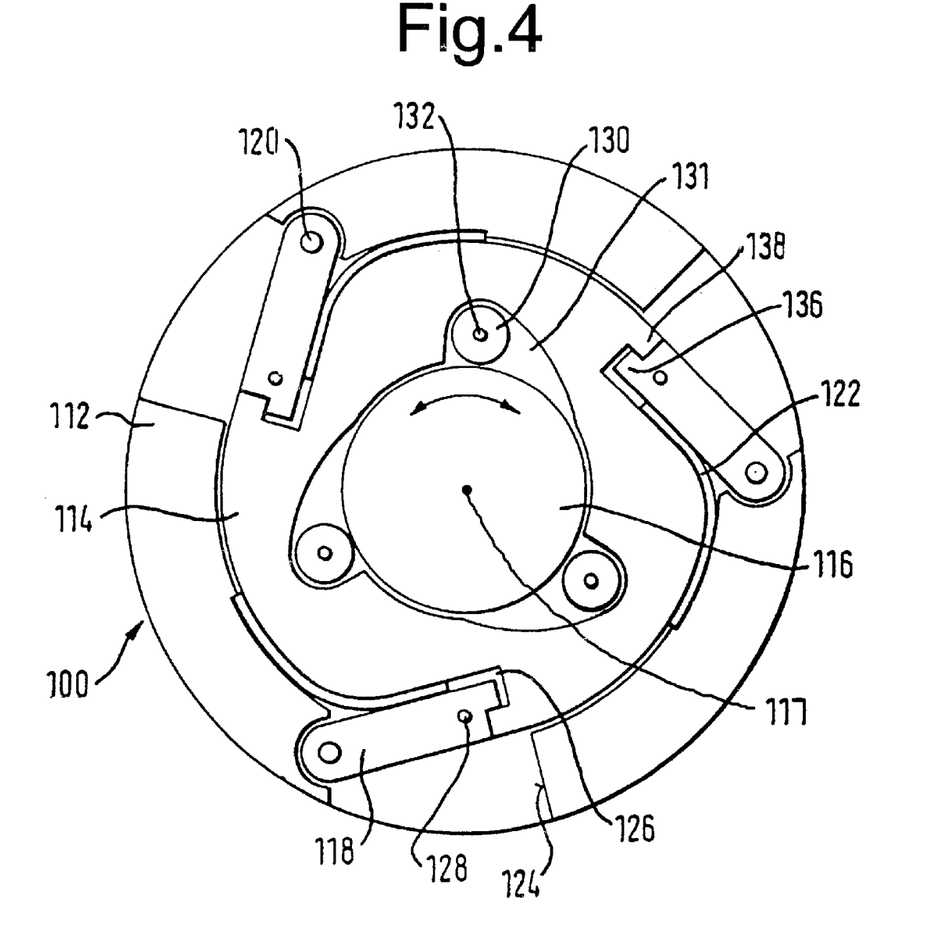
FIG. 4 shows a coupling mechanism according to a second embodiment of the invention in its initial state.
Figure 5:
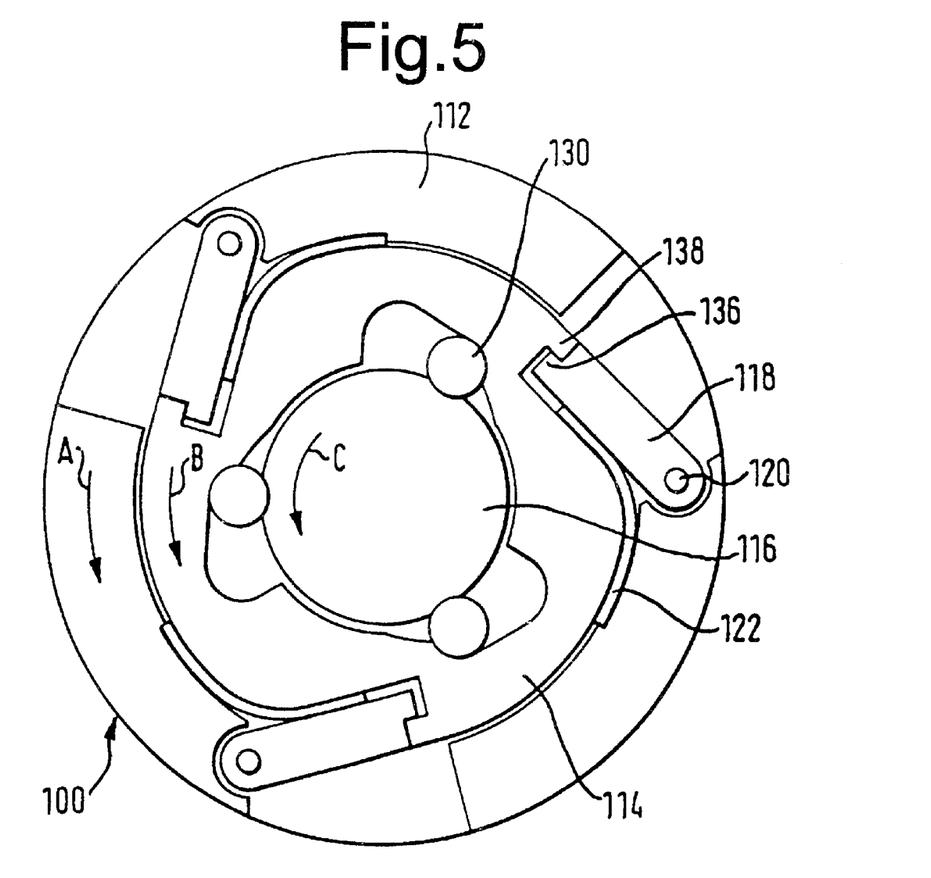
FIG. 5 shows a coupling mechanism according to second embodiment in its operating state.
Figure 6:
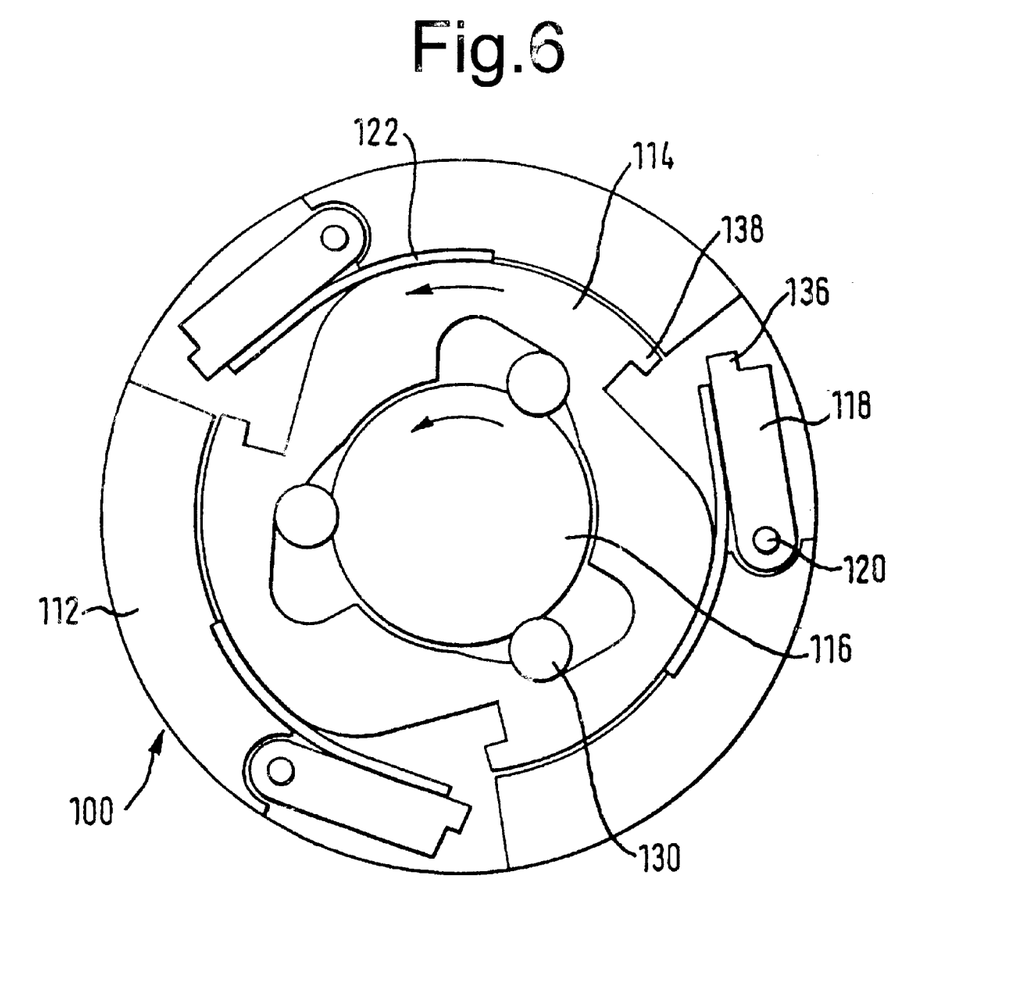
FIG. 6 shows a coupling mechanism according to a second embodiment after operation.

FIGS. 4 to 6 show a second embodiment of a coupling mechanism according to the invention. Components which are already known from the first embodiment are provided with the same reference number, increased by 100.

In this case, also, the coupling mechanism 100 consists of a driving part 112, an intermediate part 114 and a driven part 116, the driving part 112 and intermediate part 114 being connected by means of a pawl coupling and intermediate part 114 and driven part 116 being connectable with each other by means of a grip roller coupling.

In the initial state which is illustrated in FIG. 4, the pawls 118 of the pawl coupling are engaged, whilst the grip roller coupling is disengaged. In contrast to the embodiment according to FIGS. 1 to 3, with this embodiment the pawls 118 of the pawl coupling are not mounted on the intermediate part but rather are rotatably mounted on the driving part 112 on an axis 120. They are acted upon radially outwards by springs 122 held on the driving part, corresponding mountings 124 being provided in the driving part 112, into which the pawls 118 can swing completely (see FIG. 6). The pawls 118 are fastened in the initial position by holding pins 128 In addition, the pawls 118 have projections 136 which cooperate with corresponding projections 138 on the intermediate part 114 and hold the pawls 118 in the initial state in engagement with the intermediate part 114. The driving part 112 and the intermediate part 114 are thus connected with each other in a form-fitting manner by means of the pawls 118 of the pawl coupling.

As set out in the description of the first example embodiment, the roll elements 130 are fastened by holding pins 132, in order to prevent a premature engagement of the grip roller coupling. The axis 117 of the belt spool can rotate freely both in the belt retraction direction and also in the belt unwinding direction within the framework of the normal function of a conventional belt retractor.

When the belt tensioner takes up its operation and moves the driving part 112 in arrow direction A (FIG. 5), the holding pins 128 of the pawls 118 are sheared off, the pawls transfer the force to the intermediate part 114 (arrow B) and couple it with the driven part 116. Through the movement, the holding pins 132 of the roll elements 130 are sheared off and the roll elements provide for a grip connection between the driven part 116 and the intermediate part 114, so that via the grip roll coupling the driven part 116 is likewise turned together with the intermediate part 114 (arrow C).

The force of the belt tensioner is now transferred via the driving part 112 and the intermediate part 114 to the driven part 116 and hence to the belt spool, and the belt is tensioned. In addition to the effect of the pressure exerted by the driving part 112, the pawls 118 are held by the projections 136, 138, hooked into each other, in connection with the intermediate part 114.

After the end of operation of the belt tensioner (FIG. 6), the connection between the driving part 112 and the intermediate part 114, which is firmly coupled to the driven part 116, through the rotation of the axis 117 of the belt spool in belt retraction direction, is for example, released by the spring of the retraction mechanism of the safety belt. Through the fact that the intermediate part 114, which is firmly connected with the axis 117 via the grip roller coupling, moves away in the belt retraction direction from the driving part 112 which is stationary again, the distance increases between the projections 136, 138 on the pawl and on the intermediate part, until the engagement of these two projections is released. Since also the holding pins 128 no longer hold the pawls 118 in position, these are pressed radially outwards by the prestressed springs 122 and they fold into the recesses 124 provided for this on the driving part 112. The axis 117 of the belt spool can now rotate freely again both in retraction and also in unwinding direction, the intermediate part 114 being entrained which is engaged by means of the grip roller coupling, and the coupling between belt tensioner and belt spool is released.

Figure 7:
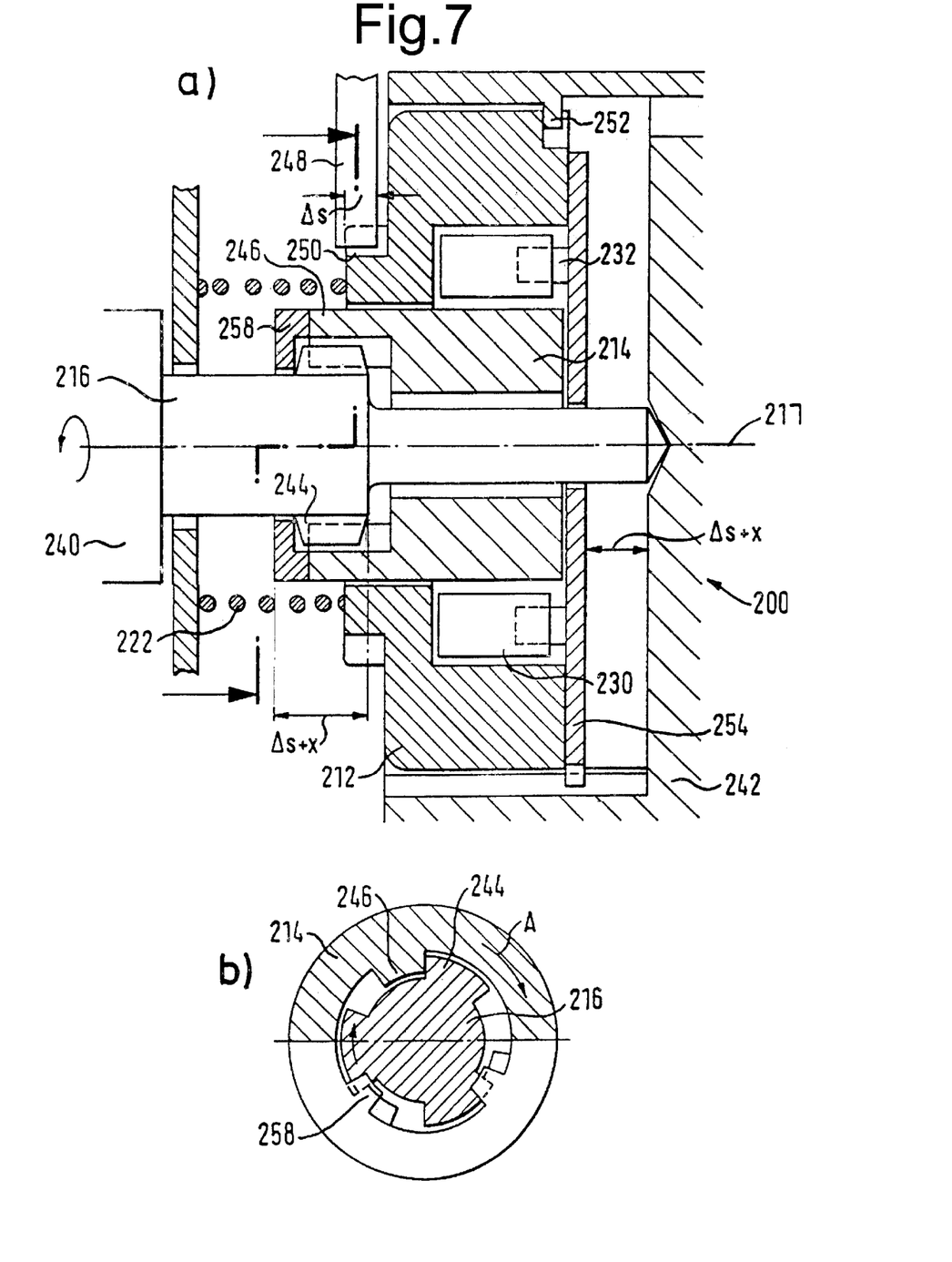
FIG. 7*a* shows a sectional view of a coupling mechanism according to a third embodiment of the invention in its initial state.
FIG. 7*b* shows a coupling between the driven part and the intermediate part of FIG. 7*a* in engaged state.

A third embodiment of the invention is illustrated in FIGS. 7a, b and 8a, b. Components already known from the first embodiment are provided with the same reference numbers, increased by 200. Here, also, the coupling mechanism 200 has a driving part 212, an intermediate part 214 and a driven part 216, and also two couplings lying therebetween. Here, the grip roller coupling is arranged between the driving part 212 and the intermediate part 214, while between the intermediate part 214 and the driven part 216, which also in this case is formed again by the axis 217 of the belt spool 240, a claw coupling is situated.

FIG. 7a shows a coupling mechanism 200 according to the invention in connection with the axis 217 of a belt spool 240 in the initial state. The axis 217 of the belt spool is mounted in a housing with a housing wall 242 on the bearing side. The coupling mechanism is arranged between the housing wall 242 on the bearing side and the belt spool 240. A section 244 of the axis 217 of the belt spool has the first part of a claw coupling. A section 246 of the intermediate part 214 forms the second part of this claw coupling. Between the intermediate part 214 and the driving part 212, the roll elements 230 of a grip roller coupling are situated. The roll elements 230 of the grip roller coupling, which is arranged between the intermediate part 214 and the driving part 212, are fixed by holding pins 232 to the holding plate 254, in order to prevent a premature engagement. A drive cogwheel 248 of a belt tensioner (not shown) engages into a toothing 250 of the driving part 212 in order to set the latter in rotation when the belt tensioner operates.

On the bearing side of the axis 217 of the belt spool, a holding plate 254 is provided which is arranged at a distance s to the housing wall 242 of the belt retractor on the bearing side. The roll elements 230 are fastened to this holding plate 254 by holding pins 232. In addition, on the belt spool side, a spring 222 is provided, which engages on the drive element 212 and pre-stresses it in the direction of the housing wall 242 on the bearing side. In the initial state, the driving part 212 is fastened by holding pins 252. In addition, a first part 258 of a bayonet closure 258, 244 is connected with the intermediate part 214, the second part 244 of which is formed by the claws 244 of the claw coupling on the axis 217 of the belt spool (FIG. 7b). Here the claws 244, on movement of the axis 217 in the belt retraction direction, engage behind the projections of the first part 258 of the bayonet closure.

In the initial state, the belt spool rotates and in so doing entrains the intermediate part 214 via the claw coupling 244, 246. This takes place both in the belt retraction direction and also in the belt unwinding direction.

During the operation of the belt tensioner, the driving part 212 is set in rotation via the drive wheel 248 and in so doing entrains the roll elements 230 of the grip roller coupling, which moreover can be constructed in a similar manner to that illustrated in the first two embodiments. Through the locking of these roll elements with the driving part 212 and the intermediate part 214, a force-fitting connection occurs between the driving part 212 and the intermediate part 214. This, in turn, provides for the fact that via the claw coupling 244, 246 between the intermediate part 214 and the axis 217 of the belt spool, the belt spool 240 is set in rotation in the winding direction (arrow A) and hence tensions the belt. With the start of the movement of the driving part 212, the holding pins 232, 252, which fix the roll elements 230 or the driving part 212 itself, are sheared off. The claw coupling 244, 246 is now held in engagement by the bayonet closure 258, 244 against the force of the spring 222 (FIG. 7b), which presses the driving part 212, now no longer fixed by holding pins 252, outwards in the direction of the housing wall 242 on the bearing side. The bayonet closure 258 arranged on the intermediate part 214 in so doing partially overlaps the claws 244 of the belt spool axis and thus provides for a lateral fixing of the unit of intermediate part 214 and driving part 212 and thereby counteracts the elastic force.

Figure 8:
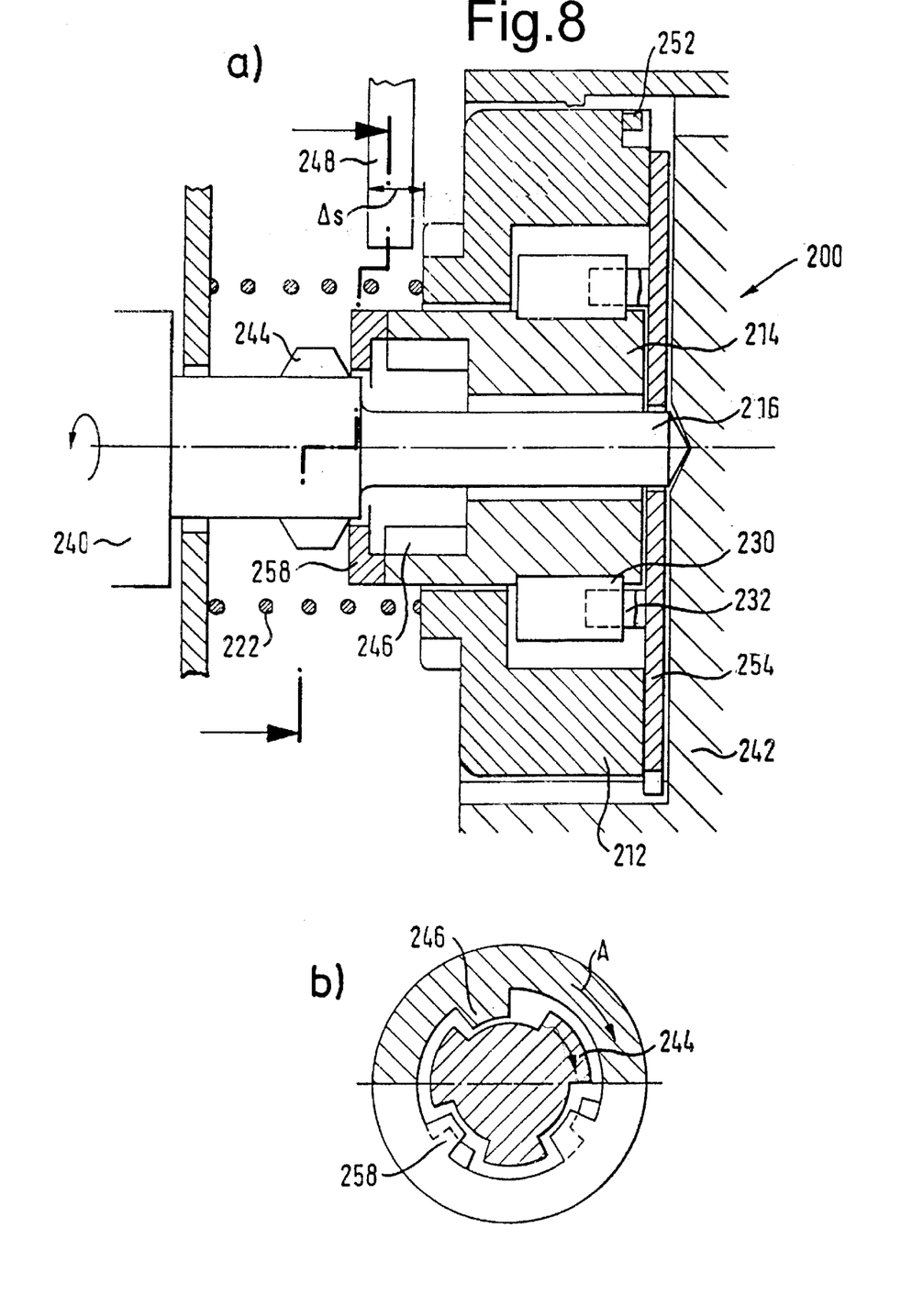
FIG. 8*a* shows a sectional view of a coupling mechanism according to a third embodiment after operation.
FIG. 8*b* shows a coupling between the driven part and the intermediate part of FIG. 8*a* in disengaged state.

If the operation of the belt tensioner is completed, the situation illustrated in FIGS. 8a, b occurs. The rotating of the axis 217 of the belt spool in retraction direction (arrow A) releases the claws 244 of the belt spool axis 217 from the first part of the bayonet closure 258 (FIG. 8b), whereby it is possible for the spring 222 to displace the unit of intermediate part 214 and driving part 212 in the direction of the housing wall 242 on the bearing side. The claw coupling 244, 246 has a certain play, so that the axis 217 of the belt spool can rotate with respect to the intermediate part 214 by an angle range, before the claws of the coupling 244, 246 come into engagement with each other. The angle range is selected here so that the claws 244 of the belt pool axis 217 on the one hand come into engagement with the part 258 of the bayonet closure, but on the other hand can detach themselves completely from this part 258 of the bayonet closure and thus permit the intermediate part 214 to be able to be displaced laterally along the axis 217 of the belt spool 240. This displacement path s is selected such that the claws 246 of the intermediate element 214 come out of engagement with the claws 244 of the belt spool axis 217. In addition, the driving part 212 and the drive cogwheel 248 are uncoupled. The spring 222 now holds the unit of driving part 212 and intermediate part 214 pressed against the rear housing wall 242. In order to ensure a reliable disengagement of the claw coupling, the distance s which the holding plate 254 is displaced in the direction of the housing wall 242, is additionally enlarged by an excess stroke x. Thus, after operation, the coupling mechanism is released again and the axis 217 of the belt spool 240 can move freely again both in the retraction direction and also in the belt unwinding direction.

What is claimed is:

1. A coupling mechanism for connecting a belt tensioner drive with a belt spool of a belt retractor for a vehicle safety belt, comprising:
    a driving part,
    an intermediate part,
    a driven part,
    a form-fitting coupling having a coupling means, a spring element and a retaining means, said coupling means being movable form an engaged position into a disengaged position,
    and a force-fitting coupling,
    said form-fitting coupling and said force-fitting coupling being connected in series,
    said coupling mechanism having an initial state in which said force-fitting coupling is disengaged and said form-fitting coupling is engaged and in which said coupling means is in its engaged position,
    said coupling means being held by said retaining means in its engaged position and being biased by said spring element such that said coupling means is movable by said spring element into said disengaged position on releasing of said retaining means.

2. The coupling mechanism of claim 1 wherein said coupling mechanism has an operation state in which both said form-fitting coupling and said force-fitting coupling are engaged.

3. The coupling mechanism of claim 1, wherein said coupling mechanism has a state after operation in which said form-fitting coupling is disengaged and said force-fitting coupling is engaged.

4. The coupling mechanism of claim 1, wherein said form-fitting coupling is arranged between said driving part and said intermediate part and said force-fitting coupling is arranged between said intermediate part and said driven part.

5. The coupling mechanism of claim 1, wherein said force-fitting coupling is arranged between said driving part and said intermediate part and said form-fitting coupling is arranged between said intermediate part and said driven part.

6. The coupling mechanism of claim 4, wherein said form-fitting coupling is a pawl coupling.

7. The coupling mechanism of claim 1, wherein said force-fitting coupling is a grip roller coupling.

8. The coupling mechanism of claim 1, wherein said driven part is formed by an axle of a belt spool of a belt retractor.

9. The coupling mechanism of claim 1, wherein said force-fitting coupling is a grip roller coupling having roll elements and wherein said form-fitting coupling is a pawl coupling, said coupling means being a pawl, said retaining means being a holding pin which in said initial state holds Said pawl in said engaged position.

10. The coupling mechanism of claim 1, wherein another spring is provided which biases said drive part such that after operation, a rotation of said driven part is effected whereby said retaining means of said form-fitting coupling is released.

11. The coupling mechanism of claim 10, wherein said another spring is a return spring of a belt retractor.

12. A coupling mechanism for connecting a belt tensioner drive with a belt spool of a belt retractor for a vehicle safety belt, said coupling mechanism comprising:
- a driving part rotatable by said belt tensioner drive,
- a rotatable driven part engaging said belt spool of said belt retractor,
- a rotatable intermediate part located between said driving part and said driven part,
- a form-fitting coupling including a coupling means movable from an engaged position into a disengaged position, said form-fitting coupling including a spring element for biasing said coupling means to move into said disengaged position, said form-fitting coupling including a releasable retaining means for retaining said coupling means in said engaged position,
- said coupling means, in said engaged position, blocking a relative rotation between one of said driving part and said driven part, and said intermediate part, and
- a force-fitting coupling movable from a disengaged position into an engaged position, said force-fitting coupling, when in said engaged position, blocking a relative rotation between one of said driven part and said driving part, and said intermediate part,
- said form-fitting coupling and said force-fitting coupling being connected in series,
- said coupling mechanism having an initial state before actuation of said belt tensioner drive in which said force I fitting coupling is in said disengaged position and in which said coupling means of said form-fitting coupling is in said engaged position,
- said coupling mechanism having an operating state, upon actuation of said belt tensioner drive, in which said force-fitting coupling is in said engaged position and in which said coupling means of said form-fitting coupling is in said engaged position,
- said retaining means releasing said coupling means and said coupling means moving from said engaged position into said disengaged position by said spring element after completion of said operating state of said coupling mechanism.

13. The coupling mechanism according to claim 12, wherein said spring element is connected between said coupling means and said intermediate part.

14. The coupling mechanism according to claim 12, wherein said spring element is connected between said coupling means and said driving part.

15. The coupling mechanism according to claim 12, wherein said form-fitting coupling is arranged between said driving part and said intermediate part and said force-fitting coupling is arranged between said intermediate part and said driven part.

16. The coupling mechanism of claim 12, wherein said force-fitting coupling is arranged between said driving part and said intermediate part and said form-fitting coupling is arranged between said intermediate part and said driven part.

17. The coupling mechanism of claim 12, wherein said form-fitting coupling is a pawl coupling.

18. The coupling mechanism of claim 12, wherein said force-fitting coupling is a grip roller coupling.

19. The coupling mechanism of claim 12, wherein said driven part is formed by an axle of a belt spool of a belt retractor.

20. The coupling mechanism of claim 12, wherein said force-fitting coupling is a grip roller coupling having roll elements and wherein said form-fitting coupling is a pawl coupling, said coupling means being a pawl,. said retaining means being a holding pin which in said initial state holds said pawl in said engaged position.

21. The coupling mechanism of claim 12, wherein another spring is provided which biases said drive par t such that after said operating state, a rotation of said driven part is effected whereby said retaining means of said form-fitting coupling is released.

22. The coupling mechanism of claim 21, wherein said another spring is a return spring of a belt retractor.

* * * * *

UNITED STATES PATENT AND TRADEMARK OFFICE
CERTIFICATE OF CORRECTION

PATENT NO.    : 6,443,380 B1
DATED         : September 3, 2002
INVENTOR(S)   : Joachim Biller et al.

It is certified that error appears in the above-identified patent and that said Letters Patent is hereby corrected as shown below:

Column 8,
Line 55, delete "4" and insert -- 1 --.

Column 9,
Line 37, after "forde" delete "I".

Signed and Sealed this

Eighteenth Day of November, 2003

JAMES E. ROGAN
*Director of the United States Patent and Trademark Office*